NARROW BAND SPEECH TRANSMISSION SYSTEM

Filed May 1, 1964 2 Sheets-Sheet 1

INVENTOR
J. G. KREER, JR.
BY G. E. Hirsch, Jr.
ATTORNEY 3,361,877

NARROW BAND SPEECH TRANSMISSION SYSTEM

John G. Kreer, Jr., Bloomfield, N.J., assignor to Bell Telephone Laboratories, Incorporated, New York, N.Y., a corporation of New York Filed May 1, 1964, Ser. No. 364,096
11 Claims. (Cl. 179—15.55)

ABSTRACT OF THE DISCLOSURE

The transmission of speech over narrow band media may be effected by the development of representative signals of a much narrower bandwidth than the original speech signal. Analysis of spectrogram charts indicates that speech is comprised, basically, of four quasi-sinusoidal functions, each modulated in both amplitude and frequency, which appear as relative maxima. To develop signals representative of these quasi-sinusoidal functions, sampled pulses of an applied speech signal are time compressed in a recirculating delay loop to form a continuous time compressed counterpart of the speech signal. The compressed signal is analyzed to determine the amplitude and frequency of the maximal components and this information is transmitted to a distinct station where it may be utilized to reproduce the original speech signal.

Figures 1, 3:
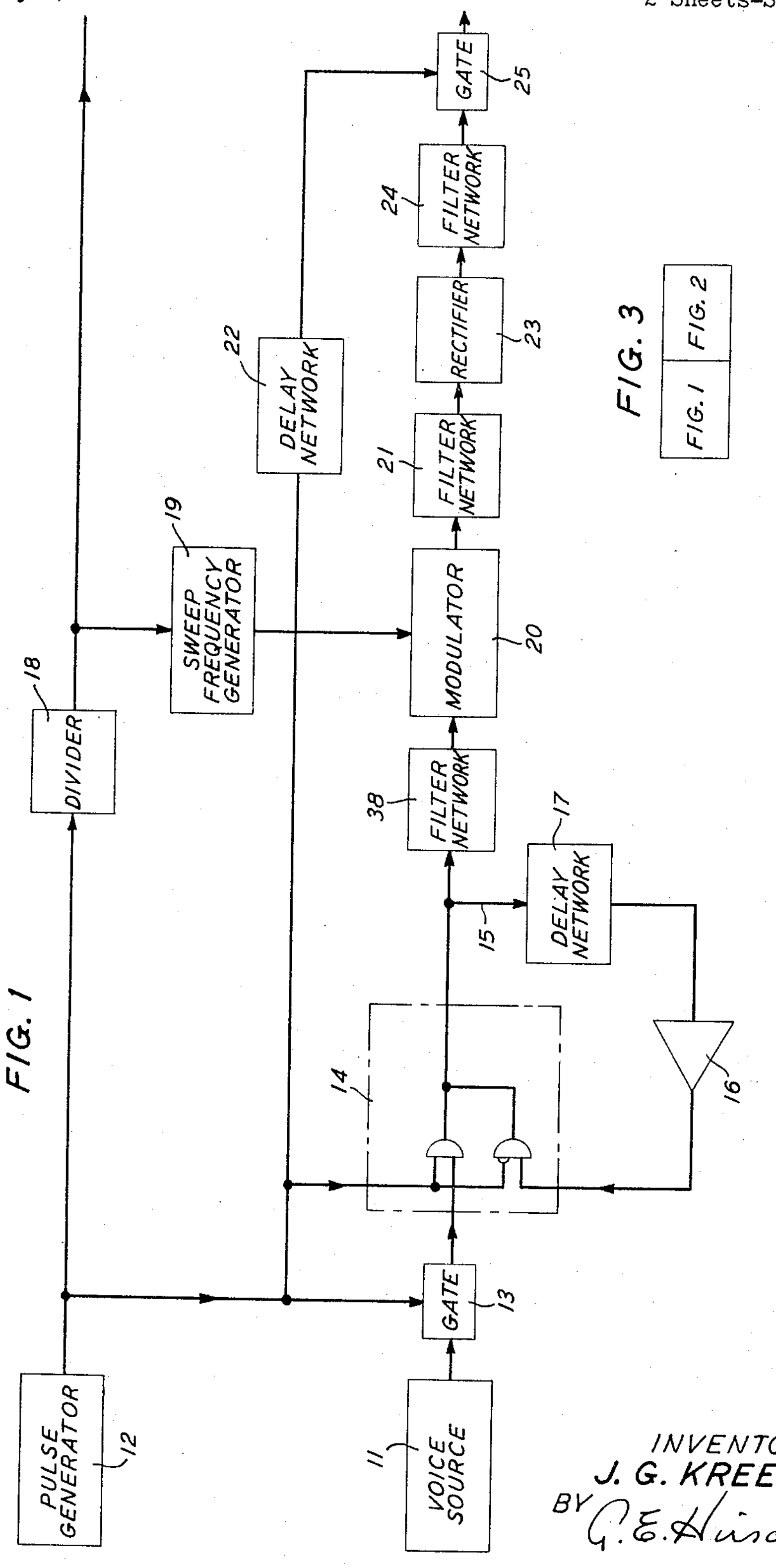

This invention pertains to the transmission of speech information and, more particularly, to the transmission of speech over narrow band media by vocoder techniques.

The utilization of vocoder techniques to effect the transmission of speech has been beset by numerous practical shortcomings. To overcome these shortcomings, recourse has been made to fundamental studies of those attributes of speech necessary for the communication of information. Of invaluable aid in these studies has been the use of speech spectrograms.

It is well known that speech, though it may be considered to be a single wave which varies in a complex manner, may also be viewed as a composite signal constructed of fundamental building blocks which comprise related spectral components of diverse frequencies. The speech spectrogram is capable of representing graphically as a function of time, the variation in amplitude and frequency of these spectral components. The wave is depicted such that the dimensional coordinates of the graph represent frequency and time, respectively, and the brightness or darkness of each coordinate point in the visual presentation indicates the amplitude of a particular frequency component at a particular instant of time. Recent studies have shown that a spectrogram of a person's speech is uniquely identifiable with the spoken voice signal. This follows from the fact that an individual's speech characteristics are primarily determined by the vocal cavities and articulators which, much like organ pipes, cause energy to be reinforced in specific spectra areas.

This relationship between the information contained in a spectrogram and the spoken voice signal is turned to account in the present invention. Analyses of spectrograms show that usually four, at times three, quite narrow lines curving across the chart stand out in bold relief. These lines signify that speech is basically composed of four quasi-sinusoidal functions, each modulated in both amplitude and frequency. Furthermore, these functions require, severally and jointly, a much narrower band for transmission than does the original voice wave. Prior art attempts to extract and transmit these fundamental attributes of speech have had limited success. Essentially, this was due to the inability, instantaneously and continuously, to develop signals representative of these four quasi-sinusoidal functions.

Apparatus of the prior art has primarily relied upon the use of contiguous narrow band filters, segmented into bands which approximately define the regions of the frequency spectrum in which the four fundamental functions appear. Reliance upon the use of narrow band filters has had a number of concomitant ill effects. The use of narrow band filters has prevented an instantaneous determination of the four quasi-sinusoidal functions. It is well known that as one attempts to narrow the bandwidth of a filter in order to improve resolution, the time response of the filter, approximately equal to the reciprocal of the bandwidth, must necessarily increase. The resultant effect is to average out frequency components present in the voice signal. In the visual presentation of the signal in a spectrogram, this effect would be analogous to "smearing" the surface of the chart, consequently reducing the discernibility of individual spectral components. In addition, to facilitate analysis, the prior art segments the contiguous filters into arbitrary groupings, e.g. three, thus assuming that only one component of interest is present in an assigned band of the frequency spectrum defined by the grouping. As a consequence of the use of narrow band filters and their arbitrary segmentation, additional apparatus is required, such as fundamental pitch detectors, "hiss" and "buzz" sources, and the like, to compensate for the lack of fidelity in the reproduction of the quasi-sinusoidal functions. It is well known, by those skilled in the art, that the addition of such apparatus is not an insignificant limitation.

It is, therefore, an object of this invention to transmit speech information over narrow band media without the use of a fundamental pitch detector.

Another object is to transmit speech by instantaneously and continuously developing signals representative of the relative maximal spectral components present in a voice signal.

Still another object is to effect speech transmission over media having a total bandwidth considerably less than that of the speech itself.

These objects are accomplished, in accordance with the present invention, by making use of the characteristics of an instantaneous spectrum. Using this concept, a finite segment of a given function is considered to be one period of a periodic function which is then expanded in a Fourier series whose coefficients constitute the instantaneous spectrum of the function. In general, this spectrum will be a series of discrete frequencies spaced by a frequency interval such that the chosen finite segment is the period of the frequency interval. As the segment slides along in time, the magnitude and phase of the coefficients of this series will vary, usually slowly, as a function of time. If it were necessary to transmit all information represented by the coefficients of the spectral series, no saving in bandwidth would be effected. It is the recognition that only selected components, i.e., the four quasi-sinusoidal functions of speech, which appear as relative maxima on a spectrogram, are necessary for the efficient transmission of speech that is turned to account by this invention.

By the practice of this invention, an applied voice signal is sampled at a rate greater than twice the highest baseband frequency and the resultant pulse amplitude modulated signal is applied to a logic network. The network serves to introduce pulses into a delay loop and to inhibit the same pulses after having circulated a specified number, N, illustratively one hundred, of times around the loop. The time duration of the loop is chosen to be a fixed percentage $$1-\frac{1}{N}$$

e.g. 99 percent, of the sampled voice signal pulse interval.

A pulse will be inhibited when it appears at the input of the logic network coincident with a sampling pulse. Since the duration of the delay is a fixed percentage, illustratively 99 percent, of the signal pulse interval, a pulse will circulate N times, e.g. one hundred times, before being inhibited. After each traverse of the loop, an additional pulse is added to the loop, effectively squeezing together the train of pulses and reducing the pulse interval by a factor $1/N$. As a result of this time compression, all of the frequencies in the spectrum of the original signal are multiplied by a factor N. The time compression and sampling is carried on in a continuous manner, removing the oldest sample in the replica and replacing it with a new one each time the replica completes a cycle of circulation. A spectrum analysis may now be performed utilizing a broadband filter with a correspondingly shorter response time. Thus the analysis may take place contemporaneously with the generation of a message. The output of the heterodyne filter is an analog representation of the spectrum with apparently infinite resolvability. However, since the spectrum is produced by only N values, no more than N independent coefficients can be determined. Furthermore, since the ear is capable of only finite resolution there is no need to determine the frequencies of the spectral components exactly. Accordingly, the output of the heterodyne filter is sampled at N instants equally distributed across the time scale of the filter sweep, thus producing N distinct possible frequencies, from which the nearest values to the actual frequencies of the spectral components are determined. This determination is accomplished by applying successive components to delay networks and comparing an incident component with its adjoining neighbors. If the incident pulse is greater in amplitude than its neighbors, it represents a component of one of the quasi-sinusoidal functions. This comparison is accomplished continuously and instantaneously thereby determining all components which are relative maxima. The resultant signals are transmitted to a receiver station accompanied by signals representing their respective frequencies. The frequencies of these relative maximal components are determined by a ramp generator synchronized to the spectrum analyzer. Signals are generated proportional in amplitude to the frequency of the spectral components. Only those signals associated with relative maximal components are transmitted. Assuming that four quasi-sinusoidal functions are present, eight channels will be required necessitating a bandwidth not greater than 400 cycles per second at most. Thus by the practice of this invention narrow band speech transmission is accomplished.

These and further features and objects of the invention, its nature and various advantages, will be readily apparent upon consideration of the attached drawings and of the following detailed description of the drawings.

Figure 2:
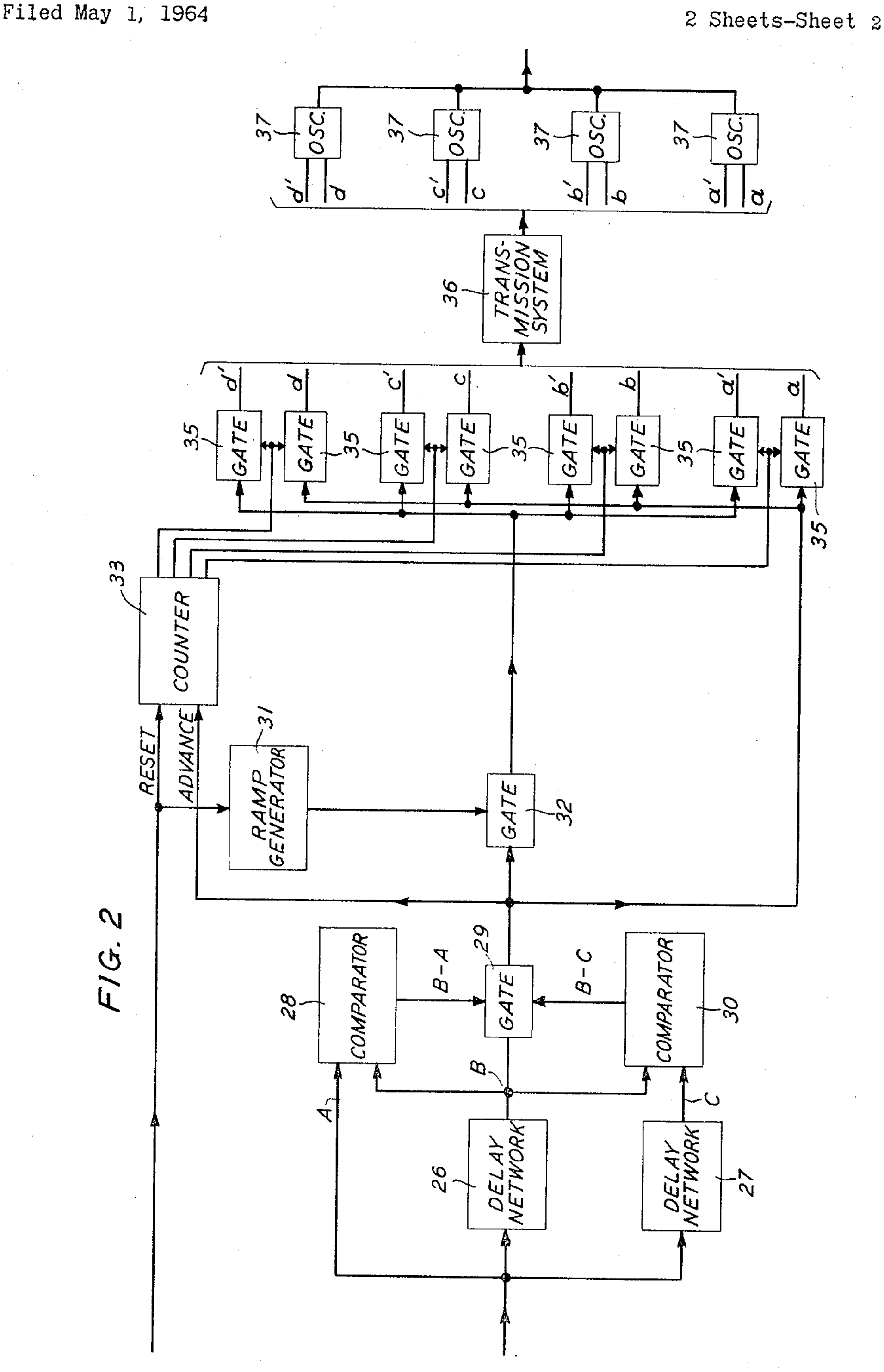

FIGS. 1 and 2 of the drawings, interconnected as indicated in FIG. 3, illustrate in block diagram form a narrow band speech transmission system.

As illustrated in FIGS. 1 and 2, a source of voice signals is sampled at an appropriate rate to develop a pulse amplitude modulated signal representative of the applied voice signal. The train of pulses developed is applied to a logic network which consists of a pair of conjugate AND circuits used for the introduction of the pulses into a delay loop and their subsequent removal. Sampled pulses are stored in the delay loop and circulated for a period of time determined by the time duration of the delay. The duration is chosen such that a number N of the latest voice samples will always be present in the delay loop. As explained more fully in the description below, the signals circulating in the delay loop are time compressed and, accordingly, frequency expanded. This frequency expanded signal is applied to a heterodyne filter which develops signals indicative of the spectral components present in the applied signal. This output of the heterodyne filter is sampled at N instants during each sweep of the heterodyne filter thus producing N distinct possible frequencies from which the nearest values to the actual frequencies of the spectral components are determined. The sampled components appearing at the output of the sampling gate are applied to separate delay networks and continuously and instantaneously compared to determine spectral components which are relative maxima. Those components which are greater in amplitude than their adjoining neighbors are transmitted by any convenient transmission system, along with information representative of the spectral frequency of the components, to voltage controlled oscillators which develop signals having a frequency and amplitude corresponding to the maximal components.

The transmission of the amplitude and frequency information requires, in a conventional implementation, eight channels each having a maximum bandwidth of forty cycles per second (c.p.s.) resulting in a maximum system requirement of 320 c.p.s. Thus, it can be seen that a considerable reduction in bandwidth is accomplished by the practice of this invention.

Turning now to a more detailed description of the present invention, as illustrated in FIGS. 1 and 2, a convenient source of voice signals 11 is applied to gate 13 which is activated by pulse generator 12. The applied voice signal is sampled by gate 13 at a rate determined by the well-known sampling theorem. The pulses appearing at the output of gate 13 and representative of the applied voice signal are applied to logic network 14. Logic network 14 comprises a pair of conjugate AND gates so arranged that one and only one gate is open at every instant. The opening of the gates is controlled by pulse generator 12. A pulse appearing at the input of logic network 14 is, accordingly, gated into delay loop 15. Delay loop 15 includes an amplifier 16 and a delay network 17 so arranged that the delay loop has approximately unity transmission gain and a delay, for illustrative purposes, of .99 the pulse interval of the sampled voice signals appearing at the input of logic network 14. Because the delay of the loop is chosen to be 99 percent of the pulse interval of the sampled signal, and because inhibition occurs simultaneously with a sampling pulse, a pulse will traverse delay loop 15 one hundred times before it is inhibited by logic network 14.

After each traverse an additional input pulse is added to the network. The resultant effect is to squeeze the train of input pulses together, shortening the time interval between pulses, making possible in the pulse time interval of the original train of pulses the analysis of N, i.e., one hundred, time compressed pulses. Thus the latest number N of consecutive samples are stored in the delay line separated at a pulse interval of one hundredth, $1/N$, the original. The signal present in the delay line is applied continuously to a low pass filter network 38 to develop an analog voltage of the time compressed voice signal.

This compressed analog signal is applied to modulator 20 which, cooperating with sweep frequency generator 19 and band pass filter 21, performs a spectral analysis of the applied signal. This combination of sweep frequency generator, modulator and filter to perform a spectral analysis is well known as a "heterodyne filter" and is described in Patent 2,705,742 issued Apr. 5, 1955, to R. L. Miller. The sweep generator 19 is swept at a rate of one hundredth the sampling frequency by timing signals derived from divider 18, e.g., a decimal counter, which is driven by pulse generator 12. The sweep range of generator 19 is chosen so that at the initiation of the sweep, modulator 20 will develop a signal if a spectral component of the original voice wave is present and of a frequency between 100 and 130 cycles per second (c.p.s.). The termination of the sweep is selected so that a spectral component if present in the original voice wave between 2970 and 3000 c.p.s. appears at the output of modulator 20. Rectifier 23 and low pass filter 24 operate to rectify and filter the spectral components appearing at the output of band pass filter 21. The mid-band frequency component of the band pass filter is thereby removed resulting in a train of pulses proportional in amplitude to the original spectral components of the voice wave. Since the ear is capable of only finite resolution, there is no need to determine the frequencies of the spectral components exactly. Accordingly, the output of filter 24 is sampled N times, e.g., one hundred times, during each sweep of generator 19 by gate 25, which is activated by pulse generator 12 via the adjustable delay network 22. This delay is introduced to compensate for the inherent delay present in the apparatus preceding gate 25.

The sampled spectral components, "spikes," appearing at the output of gate 25 are then applied to a system of delay networks and comparators to determine those spectral components which are relative maxima. Delay network 26 is adjusted to introduce a delay equal to the interval between spikes while delay network 27 is adjusted to be of a length equal to two such intervals. Comparator 28, e.g., a differential circuit, of any desired construction, compares an incident spectral component, A, with an immediately preceding spike, B, and develops a signal, B–A, proportional to their difference in amplitude. Comparator 30 compares the aforementioned component, B, with a spike, C, immediately preceding it, and develops a signal, B–C, proportional to the difference between these two signals. If these two difference signals, developed by comparators 28 and 30, are positive, they will activate gate 29 which permits the center spike, B, of the aforementioned three spikes to be transmitted to the remaining portion of the system. Essentially what has been done is that the middle one of three spikes has been compared with immediately adjacent neighboring components to determine if it is greater in amplitude than its neighbors.

The spikes appearing at the output of gate 29, representative of relative maxima, are used to activate a four-stage decimal counter 33 and the gate 32. The counter 33 sequentially activates the gates 35 allowing relative maximal components to be transmitted by transmission system 36 to a distant receiver. Additionally, the maximal components appearing at the output of gate 29 allow signals from ramp generator 31 to be transmitted to gates 35. Ramp generator 31 is activated by divider 18, which also resets counter 33 at the beginning of each frequency sweep of generator 19, and generates a signal of an amplitude corresponding to the frequency sweep of generator 19. Thus, the amplitude of a signal appearing at the output of generator 31 is proportional to the representative frequency of the spectral component activating gate 32. These two signals, the one representative of the amplitude of the maximal component and the other representative of the frequency of said component are sequentially transmitted by gates 35 to transmission system 36. Any transmission system capable of transmitting eight relatively narrow band channels may be used. Thus, for example, transmission system 36 may include eight conductors, eight frequency division channels on a single conductor, eight time division channels on a single conductor, or any pulse code modulation transmission system. The information appearing at the output of transmission system 36 is applied to voltage controlled oscillators 37, e.g., a variable reactance oscillator cascaded with a variable gain amplifier, for reproducing signals of the frequency and amplitude of the maximal components. Each voltage controlled oscillator is assigned to an appropriate pair of gates 35 and reproduces signals of a frequency and amplitude corresponding to those appearing at the input of gates 35. The resultant spectral components reproduced by voltage controlled oscillators 37 may then be applied to a utilization device of any desired sort, such as, for example, a loudspeaker.

It is to be understood that the embodiments shown and described are illustrative and that further modifications of this invention may be contemplated by those skilled in the art without departing from the scope and spirit of the invention. For example, if additional fidelity, is required, an auxiliary channel may be utilized for the transmission of fundamental pitch information to enforce the speech signals developed by the present invention. In addition, the input speech signal may be digitalized before time compression to reduce sensitivity to noise and instability of the apparatus. Furthermore, the present system may be used for the production of speech spectrograms by coupling a suitable chart recorder to the output of network 24.

What is claimed is:

1. Apparatus for narrow band speech transmission which comprises means for developing a continuous train of samples of an applied voice signal, means for continuously storing and recirculating the most recent number, N, of said samples in a time period corresponding to $1/N$ of the time period of said N samples, means responsive to said storage means for analyzing said stored signal to derive indications of its spectral components, means responsive to said indications for selecting those components whose amplitudes are greater than immediately adjoining components, information means for determining the amplitude and frequency of said components, and means for transmitting said information to distant points where it may be utilized in the reconstruction of said voice signal.

2. Apparatus as defined in claim 1 wherein said storage means comprises logic means and delay means proportioned to introduce a delay of a predetermined fractional amount $$1-\frac{1}{N}$$

of the period of said sampled voice signal.

3. Apparatus as defined in claim 1 wherein said selection means comprises first delay means for introducing a delay equal to the time interval between said spectral components, second delay means for introducing a delay equal to twice the time interval between said spectral components, and means for comparing the amplitudes of incident spectral components and components delayed by said second means, respectively, with the amplitude of a component delayed by said first means.

4. Apparatus for narrow band speech transmission which comprises means for developing a continuous train of samples of an applied voice signal, means for continuously recirculating the latest number, N, of said samples separated by a compressed pulse interval corresponding to $1/N$ of the pulse interval of said sampled voice signal, means responsive to said recirculating means for analyzing said compressed recirculating signal to derive representative indications of its spectral components, means responsive to said indications for selecting those components whose amplitudes are greater than immediately adjoining components, information means for determining the amplitude and frequency of said components, and means for transmitting said information to distant points where it may be utilized in the reconstruction of said voice signal.

5. A narrow band speech transmission system comprising, a source of voice signals, means for generating a train of pulses representative of said voice signals, pulse recirculating storage means for continuously time compressing said train of pulses, means responsive to said compressed pulse train for developing the spectral components of said voice signals, means responsive to said spectral components for selecting the relative maxima of said components, means responsive to said selected components for developing signals representative of the amplitude and frequency of said maxima, and means responsive to said developed signals for reproducing said voice signals.

6. A narrow band speech transmission system comprising, a source of voice signals, sampling means for generating a train of pulses representative of said voice signals, delay line means for time compressing said train of pulses, heterodyne filter means responsive to said compressed pulse train for developing the spectral components of said voice signals, means responsive to said spectral components for selecting the relative maxima of said components, means responsive to said selected components for developing signals representative of the amplitude and frequency of said maxima, and means responsive to said developed signals for reproducing said voice signals.

7. A narrow band speech transmission system comprising, a source of voice signals, sampling means for generating a train of pulses representative of said voice signals, recirculating delay line means for time compressing said train of pulses, heterodyne filter means responsive to said compressed pulse train for developing the spectral components of said voice signals, means responsive to said spectral components for selecting incident components greater in amplitude than immediately adjoining components on the frequency scale, means responsive to said selected components for developing signals representative of the amplitude and frequency of said selected components, and means variable in signal frequency and amplitude responsive to said developed signals for reproducing said voice signals.

8. A narrow band speech transmission system comprising, a source of voice signals, sampling means for generating a train of pulses representative of said voice signals, means to introduce a time delay of a specified value proportional to the period of said train of pulses for time compressing said train of pulses, heterodyne filter means responsive to said compressed pulse train for developing the spectral components of said voice signals, means for developing sampled signals of said components, means responsive to said sampled signals for determining the relative maxima of said signals, means responsive to said maximal signals for developing signals representative of the amplitude and frequency of said maxima, and means responsive to said developed signals for reproducing said voice signals.

9. Apparatus for analyzing and transmitting an applied voice signal which comprises, in combination, means for developing a train of pulses representative of said voice signal, delay means including logic means for developing a time compressed counterpart of said voice signal, analyzing means including a heterodyne filter for developing indications of the spectral components of said time compressed wave, means for sampling said spectral indications, logic means for continuously selecting those sampled spectral indications which are relative maxima, means for developing signals representative of the frequency of said maximal indications, means for transmitting said maximal indications and said representative signals to a displaced station, and means at said station for reproducing signals of the amplitude and frequency of said maximal spectral components.

10. Apparatus for analyzing and transmitting an applied voice signal which comprises, in combination, means for developing a train of pulses representative of said voice signal, recirculating delay line means for developing a time compressed counterpart of said voice signal, analyzing means for developing indications of the spectral components of said time compressed signal, means for sampling said spectral indications, means for continuously selecting those sampled spectral indications which are relative maxima, means for developing signals representative of the frequency of said maximal component indications, means for transmitting said maximal indications and said representative signals to a displaced station, and means at said station for reproducing signals of the amplitude and frequency of said maximal spectral components.

11. The method of artificial speech production which comprises the steps of generating a continuous time compressed recirculating counterpart of an applied voice signal, analyzing said time compressed voice signal to develop the spectral components present in said signal, sampling said spectral components, comparing each of said sampled spectral components with its immediate neighbors to determine if it is greater than said immediate neighbors, selecting said spectral components which are greater than said immediate neighbors, determining the amplitude of said selected components, determining the frequency of said selected components, and reproducing signals of a frequency and amplitude corresponding to said selected spectral components.

References Cited

UNITED STATES PATENTS 3,021,479 2/1962 Di Toro et al. ---- 179—15.55 X

OTHER REFERENCES

J. L. Flanagan, Automatic Extraction of Format Frequencies From Continuous Speech, The Journal of the Acoustical Society of America, vol. 28; No. 1, January 1956, pp. 110–118.

JOHN W. CALDWELL, *Primary Examiner.*

ROBERT L. GRIFFIN, *Examiner.*

W. S. FROMMER, *Assistant Examiner.*